United States Patent
Kann et al.

(10) Patent No.: US 12,338,629 B2
(45) Date of Patent: Jun. 24, 2025

(54) ROOFING SYSTEMS WITH PRE-ATTACHED CONDUCTIVE LAYERS FOR ELECTRONIC LEAK DETECTION

(71) Applicant: CARLISLE CONSTRUCTION MATERIALS, LLC, Carlisle, PA (US)

(72) Inventors: Christopher Kann, Newville, PA (US); Jesse Sutton, Carlisle, PA (US); Benjamin Mcfadden, Gettysburg, PA (US)

(73) Assignee: CARLISLE CONSTRUCTION MATERIALS, LLC, Carlisle, PA (US)

( * ) Notice: Subject to any disclaimer, the term of this patent is extended or adjusted under 35 U.S.C. 154(b) by 0 days.

(21) Appl. No.: 18/649,091

(22) Filed: Apr. 29, 2024

(65) Prior Publication Data
US 2024/0426106 A1    Dec. 26, 2024

Related U.S. Application Data

(60) Provisional application No. 63/522,042, filed on Jun. 20, 2023.

(51) Int. Cl.
*E04D 13/00*   (2006.01)
*E04D 11/02*   (2006.01)
*G01M 3/16*    (2006.01)

(52) U.S. Cl.
CPC ............ *E04D 13/006* (2013.01); *E04D 11/02* (2013.01); *G01M 3/16* (2013.01)

(58) Field of Classification Search
CPC ......... E04D 11/02; E04D 13/006; G01M 3/16
USPC ....................................................... 52/173.1
See application file for complete search history.

(56) References Cited

U.S. PATENT DOCUMENTS

| | | | | |
|---|---|---|---|---|
| 3,252,155 A | * | 5/1966 | Surtees | G01M 3/40 |
| | | | | 428/312.2 |
| 4,110,945 A | * | 9/1978 | Sheahan | G01M 3/16 |
| | | | | 324/696 |
| 4,397,126 A | * | 8/1983 | Nelson | E04D 13/0477 |
| | | | | 52/302.3 |

(Continued)

FOREIGN PATENT DOCUMENTS

| | | | | |
|---|---|---|---|---|
| CA | 2645384 A1 | * | 5/2010 | G08B 21/20 |
| WO | 2016001640 A1 | | 1/2016 | |

(Continued)

OTHER PUBLICATIONS

United States International Searching Authority, International Search Report and Written Opinion for corresponding International Application No. PCT/US2024/026790, mailed Aug. 15, 2024, 12 pages.

*Primary Examiner* — James M Ference
(74) *Attorney, Agent, or Firm* — David R. Heckadon; Gordon Rees Scully Mansukhani LLP

(57) ABSTRACT

A roofing system configured for electronic leak detection, including: (a) a roof deck; (b) an insulation board or a coverboard positioned above the roof deck; (c) a layer of conductive material positioned above the insulation board or the coverboard; and (d) a roofing membrane positioned above the layer of conductive material. The layer of conductive material is pre-attached at a factory onto one of: (i) the top side of the insulation board or the coverboard, or (ii) the bottom side of the roofing membrane, such that there is only one layer of conductive material in the roofing system.

13 Claims, 10 Drawing Sheets

(56) References Cited

U.S. PATENT DOCUMENTS

| | | | | |
|---|---|---|---|---|
| 4,489,531 A * | 12/1984 | Nelson | E04D 11/02 | 52/302.3 |
| 4,493,175 A * | 1/1985 | Coppola, Jr. | E04D 5/12 | 52/410 |
| 4,502,044 A * | 2/1985 | Farris | G01M 3/045 | 340/604 |
| 4,543,525 A * | 9/1985 | Boryta | G01M 3/40 | 324/559 |
| 4,565,965 A * | 1/1986 | Geesen | E04D 15/00 | 324/705 |
| 4,598,273 A * | 7/1986 | Bryan, Jr. | E04D 13/006 | 73/304 R |
| 4,719,723 A * | 1/1988 | Van Wagoner | E04D 13/1693 | 52/309.4 |
| 4,965,554 A * | 10/1990 | Darling | E04D 13/006 | 73/40 |
| 4,996,803 A * | 3/1991 | Karrfalt | E04D 13/1643 | 52/63 |
| 5,081,422 A * | 1/1992 | Shih | G08B 21/20 | 73/40 |
| 5,288,168 A * | 2/1994 | Spencer | E02D 31/00 | 324/559 |
| 5,357,202 A * | 10/1994 | Henderson | G01N 27/043 | 324/357 |
| 5,463,377 A * | 10/1995 | Kronberg | G08B 21/20 | 340/592 |
| 5,648,724 A * | 7/1997 | Yankielun | G01R 27/2664 | 324/532 |
| 5,818,340 A * | 10/1998 | Yankielun | E04D 13/006 | 324/696 |
| 5,850,144 A * | 12/1998 | Howells | E02D 31/004 | 324/559 |
| 6,167,666 B1 * | 1/2001 | Kelly | E04D 13/006 | 52/302.1 |
| 7,554,345 B2 * | 6/2009 | Vokey | G01M 3/16 | 324/718 |
| 7,602,196 B2 * | 10/2009 | Vokey | E04D 5/00 | 324/693 |
| 7,652,481 B2 * | 1/2010 | Vokey | G01M 3/165 | 324/557 |
| 7,847,560 B2 * | 12/2010 | Vokey | E04D 13/006 | 324/718 |
| 7,872,479 B2 * | 1/2011 | Lorenz | G01M 3/16 | 428/57 |
| 8,319,508 B2 * | 11/2012 | Vokey | C23F 13/02 | 324/693 |
| 8,566,051 B2 * | 10/2013 | Gunness | E04D 13/006 | 702/65 |
| 9,157,828 B2 * | 10/2015 | Jaman | E04D 13/006 | |
| 9,244,030 B2 * | 1/2016 | Vokey | G01N 27/20 | |
| 9,624,671 B1 * | 4/2017 | Gunness | E04D 13/006 | |
| 9,771,703 B1 * | 9/2017 | Golding, Jr. | B32B 5/022 | |
| 9,823,161 B2 * | 11/2017 | Gunness | E04D 13/006 | |
| 10,078,030 B2 * | 9/2018 | Wassarman | E04B 1/66 | |
| 10,214,907 B1 * | 2/2019 | Gunness | E04D 13/006 | |
| 10,352,047 B2 * | 7/2019 | Vokey | E04D 13/006 | |
| 10,488,293 B1 * | 11/2019 | Mills | G01M 3/16 | |
| 10,519,664 B1 * | 12/2019 | Gunness | G01M 3/16 | |
| 10,670,492 B2 * | 6/2020 | Jackson | H03M 1/1205 | |
| 2003/0209305 A1 * | 11/2003 | Smith | E04D 12/002 | 428/411.1 |
| 2004/0003563 A1 * | 1/2004 | Burdic | E04D 13/16 | 52/410 |
| 2007/0046481 A1 * | 3/2007 | Vokey | G01M 3/165 | 340/602 |
| 2008/0143349 A1 * | 6/2008 | Lorenz | G01M 3/16 | 324/691 |
| 2009/0044595 A1 * | 2/2009 | Vokey | E04D 13/006 | 73/1.17 |
| 2009/0139178 A1 * | 6/2009 | Vokey | G01M 3/16 | 52/749.12 |
| 2009/0188202 A1 * | 7/2009 | Vokey | E04D 5/00 | 52/741.1 |
| 2010/0141283 A1 * | 6/2010 | Vokey | G01M 3/16 | 324/705 |
| 2011/0178747 A1 * | 7/2011 | Gunness | G01M 3/16 | 702/65 |
| 2012/0197565 A1 * | 8/2012 | Gunness | G01M 3/165 | 702/64 |
| 2012/0313652 A1 * | 12/2012 | Jaman | E04D 13/006 | 324/694 |
| 2013/0067852 A1 | 3/2013 | Kalkanoglu et al. | | |
| 2014/0049247 A1 * | 2/2014 | Gunness | E04D 13/006 | 324/71.1 |
| 2014/0114590 A1 * | 4/2014 | Gunness | G01M 3/40 | 702/51 |
| 2014/0361796 A1 * | 12/2014 | Vokey | E04D 13/006 | 324/693 |
| 2015/0168329 A1 * | 6/2015 | Gunness | G01M 3/16 | 324/663 |
| 2017/0097276 A1 * | 4/2017 | Gunness | G01N 27/20 | |
| 2017/0130459 A1 * | 5/2017 | Vokey | G01N 27/048 | |
| 2017/0138812 A1 * | 5/2017 | Nosko | G01M 3/16 | |
| 2017/0205308 A1 * | 7/2017 | Wassarman | G01M 3/16 | |
| 2018/0010329 A1 * | 1/2018 | Golding, Jr. | B32B 5/26 | |
| 2018/0202163 A1 * | 7/2018 | Vokey | G01D 5/165 | |
| 2018/0320380 A1 * | 11/2018 | Crowther | G01M 3/16 | |
| 2019/0022972 A1 * | 1/2019 | Draudins | B32B 7/00 | |
| 2019/0094103 A1 * | 3/2019 | Jackson | G01M 3/165 | |
| 2019/0271157 A1 * | 9/2019 | Baggs | B32B 3/02 | |
| 2019/0345668 A1 * | 11/2019 | Draudins | D06M 23/04 | |
| 2021/0270691 A1 * | 9/2021 | Shah | E04D 5/10 | |
| 2021/0301536 A1 | 9/2021 | Baggs et al. | | |
| 2022/0090978 A1 * | 3/2022 | Goldstein | E04B 1/665 | |
| 2022/0275646 A1 * | 9/2022 | Jiang | B32B 7/12 | |
| 2023/0039308 A1 * | 2/2023 | Taferner | E04D 13/006 | |
| 2023/0069325 A1 * | 3/2023 | Vokey | E04D 13/006 | |
| 2023/0314264 A1 * | 10/2023 | Jackson | E04D 13/006 | 340/605 |
| 2023/0314265 A1 * | 10/2023 | Hermes | E04D 13/006 | 73/40 |
| 2024/0075711 A1 * | 3/2024 | LaBrosse | E04D 5/149 | |
| 2024/0426106 A1 * | 12/2024 | Kann | E04D 13/006 | |

FOREIGN PATENT DOCUMENTS

| | | | | |
|---|---|---|---|---|
| WO | WO-2021165547 A1 * | 8/2021 | | E02D 31/00 |
| WO | WO-2022032386 A1 * | 2/2022 | | E04D 13/006 |

* cited by examiner

ROOFING SYSTEMS WITH PRE-ATTACHED CONDUCTIVE LAYERS FOR ELECTRONIC LEAK DETECTION

RELATED APPLICATION

The present application claims priority to U.S. Provisional Patent Application Ser. No. 63/522,042, entitled Foil Faced Polyisocyanurate Coverboard Conductive Substrate for Use with Quality Control Electronic Leak Detection, filed Jun. 20, 2023, the entire disclosure of which is incorporated herein by reference in its entirety for all purposes.

TECHNICAL FIELD

The present invention relates in general to roofing systems that use a layer of conductive material for quality control electronic leak detection (ELD) as required per ASTM D7877 "Standard Guide for Electronic Methods for Detecting and Locating Leaks in Waterproof Membranes", and in particular to low slope roofing applications of such water leak detection systems.

BACKGROUND OF THE INVENTION

A variety of quality control electronic leak detection (ELD) systems exist for detecting the presence and location of water leaks through roofing membranes. A first example is found in Detec System's IntegriScan™ system as described in Detec's U.S. Pat. No. 7,554,345. The Detec system (similar to other quality control ELD systems) requires a conductive substrate be placed directly below the roofing membrane for accurate leak detection testing. In operation, breaches, holes and seam voids within the membrane system are detected using Detec's low-voltage testing equipment and water. Specifically, a thin layer of water is applied on the top surface of the electrically insulated roofing membrane. An electric potential is applied between the wetted top surface of the membrane and a conductive layer positioned below the roofing membrane. Any water leakage through the membrane would complete the circuit, thereby making it possible to detect both the presence and location of the leak.

Currently there are several conductive substrates available in the market that are used for ELD testing. They are metal "chicken" wire mesh, conductive felt, and Detec System's TruGround™ Conductive Primer as described in Detec's U.S. Pat. No. 9,244,030. Unfortunately, all three of these products must be field installed by the roofing contractor as separate layers on the roof. In addition, due to their thickness, composition and required positioning directly below the roofing membrane, they can pose issues with fully adhered roof installations. For example, these conductive layers have to be laid down right under the roofing membrane. In addition, when chicken wire meshes are used, the aperture size of the chicken wire is important. The apertures have to be small enough to detect small leaks. However, the smaller the aperture, the denser the chicken wire. This can result in smaller bonding surface area being available when using adhesives to bond the roofing membrane to the roof.

In addition, the extra step of installing these conductive material layers adds time and cost to the project. This is because the nature of these currently available conductive substrates do not allow them to be integrated into one of the components of the roofing system by, say, laminating them at the factory. For example, a wire mesh will cause unacceptable damage to manufacturing equipment if laminated, conductive felt will have issues with adhesion to the substrate and Detec's primer will take an unacceptably long time to cure if performed on a manufacturing line.

The problem common to these above existing techniques is that the conductive layer (which may be a layer of wire, conductive felt or conductive primer) needs to be installed in a separate step prior to installation of the roofing membrane over the insulation board or coverboard. It would instead be desirable to avoid this separate step of having to install the conductive material between the insulation board or coverboard and the roofing membrane thereover. It would also be especially desirable that the grounding connection to the layer of conductive material be made quickly and easily across the full surface of the roof.

Another approach to leak detection is a "continuous monitoring" system. An example is found in U.S. Published Patent Application 2023/0314264, entitled "Leak Detection System And Method" owned by Aquatrace Ltd. In this system, a pair of foil layers are used, with one foil layer attached to each of the top and bottom of the insulation panels. The foil layers are connected together from one insulation panel to the next such that the system essentially forms one large conductive path on top of the insulation panels and one large conductive path on the bottom of the insulation panels. An array of upper electrodes is connected to the upper conductive path (typically with one electrode on the top of each insulation board's conductive foil layer). An array of lower electrodes is connected to the lower conductive path (typically with one electrode on the bottom of each insulation board's conductive foil layer). Sophisticated electronics are then used to measure the capacitance between specific pairs of upper and lower electrodes. This is done by sequentially applying a voltage between each of the pairs of upper and lower electrodes to measure capacitance therebetween across the arrays of electrodes. In order to sense this capacitance, the voltages between the pairs of upper and lower electrodes are sequentially pulsed to generate an analog signal indicative of the capacitance in the particular sensing zone. Although this system has the advantage of determining the location of the leak, this is only achieved by sophisticated electronics which are in continuous operation at all times, applying voltages between different pairs of top and bottom electrodes one after another in a repeating pattern. Additionally, the voltage polarity is often reversed to be more sensitive to measuring changes in the capacitance. Importantly, this system specifically requires two separate foil layers. One foil layer is installed and electronically connected together across the tops of the insulation boards and another is installed and electrically connected together across the bottoms of the insulation boards, respectively. The use of two separate foil layers and the need for sophisticated, continuously operating electronics makes this a very expensive system both to install and to operate. A further significant disadvantage of this system is that it does not work with mechanical fasteners since mechanical fasteners passing through the conductive foil layers on the top and bottom of the insulation board would simply short out the circuit.

What is instead desired is a simple, cost effective solution for electronic leak detection that does not rely on sophisticated electronics and signal processing and also does not require two different conductive foil layers being installed into the roof. Ideally, such a solution would also reduce (rather than increase) both the time and cost of the overall roof installation. It is also desired to provide a solution that can be used with mechanical fasteners without the risk of shorting out the electrical circuit.

Yet another approach to electronic leak detection is seen in U.S. Pat. No. 10,670,492 entitled "Leak Detection And Location System And Method" owned by Smart Leak Solutions. This system uses arrays of electrodes that spiral around one another in each cell of the many cells in the array. If a cell becomes wet, the electrical capacitance changes between the electrodes in the cell. As such, a water leak into a particular cell can be detected. Similar to the Aquatrace system above, this system also requires sophisticated electronics that sequentially applies voltage potentials to different pairs of electrodes. The voltage is pulsed to sense the capacitances of the various cells. Multiplexing, signal processing and periodically swapping voltage polarities to improve capacitance sensing are all used in this system. The system is in operation continuously as the electronics are always in use. As a result, this is also a very expensive system both to install and to operate.

What is instead desired is a simple, cost effective solution for electronic leak detection that does not rely on sophisticated electronics and signal processing and also does not require arrays of electrodes spiraling around one another in individual cells in the roof. Ideally, such a solution would not require continuous electronic monitoring, but would instead only facilitate electronic leak detection when it is actually required. For example, it would only perform electronic leak detection when monitored periodically in accordance with ASTM D7877 "Standard Guide for Electronic Methods for Detecting and Locating Leaks in Waterproof Membranes". This would significantly reduce system operational costs.

SUMMARY OF THE INVENTION

The present system provides a roofing system configured for electronic leak detection that can be operated on: (1) roofs having only insulation boards or (2) roofs having insulation boards with coverboards installed thereover. As a result, the present system is very flexible in that it can be used both in roofs having coverboards and roofs not having coverboards. Coverboards are especially useful in upgrading or retrofitting existing roofs, and are most commonly used with green roofs and overburdened roofs. As such, an advantage of the present system is that it is well suited for use both when installing new roofs, and when retrofitting or upgrading existing roofs. In contrast, existing electronic leak detection systems are not well suited for roofing retrofits.

In preferred aspects, the present system comprises:
 (a) a roof deck;
 (b) an insulation board (or a coverboard over the insulation board) positioned above the roof deck;
 (c) a layer of conductive material positioned above the insulation board (or the coverboard); and
 (d) a roofing membrane positioned above the layer of conductive material, wherein the layer of conductive material is pre-attached onto:
   (i) the top side of the insulation board (or coverboard), or
   (ii) the bottom side of the roofing membrane.

In preferred embodiments, the layer of conductive material may be: pre-attached to the top side of the insulation board or coverboard, or alternatively be pre-attached to the bottom side of the roofing membrane prior to the insulation board/coverboard or roofing membrane being shipped to a jobsite. In such aspects, the layer of conductive material can be laminated to the top side of the insulation board or coverboard or to the bottom side of the roofing membrane.

In preferred aspects, the present system further includes a plurality of conductive connectors, wherein each conductive connector electrically connects the conductive layer on the side edge of one insulation board/coverboard to a conductive layer on an adjacent insulation board/coverboard. When the conductive layer is instead pre-applied to the roofing membrane, the conductive connector electrically connects the conductive layer on the side edge of one roofing membranes to a conductive layer on an adjacent roofing membrane.

In optional embodiments, the conductive connector may be a conductive connector plate configured to be attached to side edges of a pair of adjacent insulation boards or cover boards, or a strip of conductive tape configured to be attached to side edges of a pair of adjacent insulation boards or cover boards. The conductive connector plate may optionally have teeth thereon to securely hold it onto the side edges of the adjacent conductive layers. In those specific embodiments where the conductive layer is pre-attached to the bottom of the roofing membrane, the conductive connector may simply be a strip of the roofing membrane (having the conductive layer on its bottom side), wherein the strip is simply placed upside down spanning between the side edges of two adjacent roofing membranes.

The present invention is preferably directed to a roofing system having only one conductive layer. This provides significant simplification and costs savings as compared to the Aquatrace and Smart Leak Solutions systems which require two conductive layers (being positioned above and below the insulation board).

The present system also includes an insulation board or cover board configured for use with electronic leak detection, comprising: an insulation board or coverboard; and a conductive layer (such as a foil layer) pre-attached (e.g.: laminated) onto the top side of the insulation board or coverboard. The present system also includes a roofing membrane configured for use with electronic leak detection, comprising: a roofing membrane; and a conductive layer (such as a foil layer) pre-attached (e.g.: laminated) onto the bottom side of the roofing membrane.

The present system optionally includes a method of assembling a roofing system configured for electronic leak detection, comprising:
 (a) placing an insulation board or a coverboard onto a roof deck; and then
 (b) placing a roofing membrane onto the insulation board or coverboard, wherein either:
   (i) the insulation board or coverboard has a single layer of conductive material pre-attached thereto, or
   (ii) the roofing membrane has a layer of conductive material pre-attached thereto, such that the single conductive layer is installed together with installation of the insulation board or coverboard or together with the installation of the roofing membrane.

In the various embodiments described herein, the phrase "insulation board or coverboard" is understood to mean any of the following: (i) an insulation board alone with no coverboard thereover; (ii) a coverboard alone with no insulation board thereunder, or (iii) a coverboard sitting on top of an insulation board. It is to be understood therefore that the present invention will operate in all of these configurations. This is because some roofing systems have insulation boards covered by roofing membranes, other roofing systems have coverboards covered by roofing membranes, and still others have insulation boards covered by coverboards that are in turn covered by roofing membranes. Coverboards are often used when performing roofing retrofits, or when working with green or overburdened roofs. The present invention covers and contemplates all of these different designs. In various optional designs, the conductive layer may be made of any one of: a foil; a non-woven or woven textile; a conductive cellulosic material, or other suitable conductive material. The roofing membrane itself may optionally be made of TPO; EPDM; PVC or other suitable material.

The present system preferably further optionally includes a method of performing electronic leak detection on a roof, comprising:
(a) providing a roof having: a roof deck, an insulation board or coverboard on top of the roof deck, a single conductive layer on top of the insulation board or coverboard, and a roofing membrane on top of the conductive layer;
(b) applying a voltage potential between the top of the roofing membrane and the single conductive layer; and then
(c) measuring ohmic resistance to the applied voltage potential to determine one of:
    (i) a location of a roof leak, or
    (ii) a size of a roof leak.

In preferred aspects, applying a voltage potential between the top of the roofing membrane and the conductive layer comprises applying a voltage potential between water on the top of the roofing membrane and a roof vent or solar mounting system that is connected to the roof deck and projects up through the roofing membrane.

DETAILED DESCRIPTION OF THE DRAWINGS

Figure 1A:
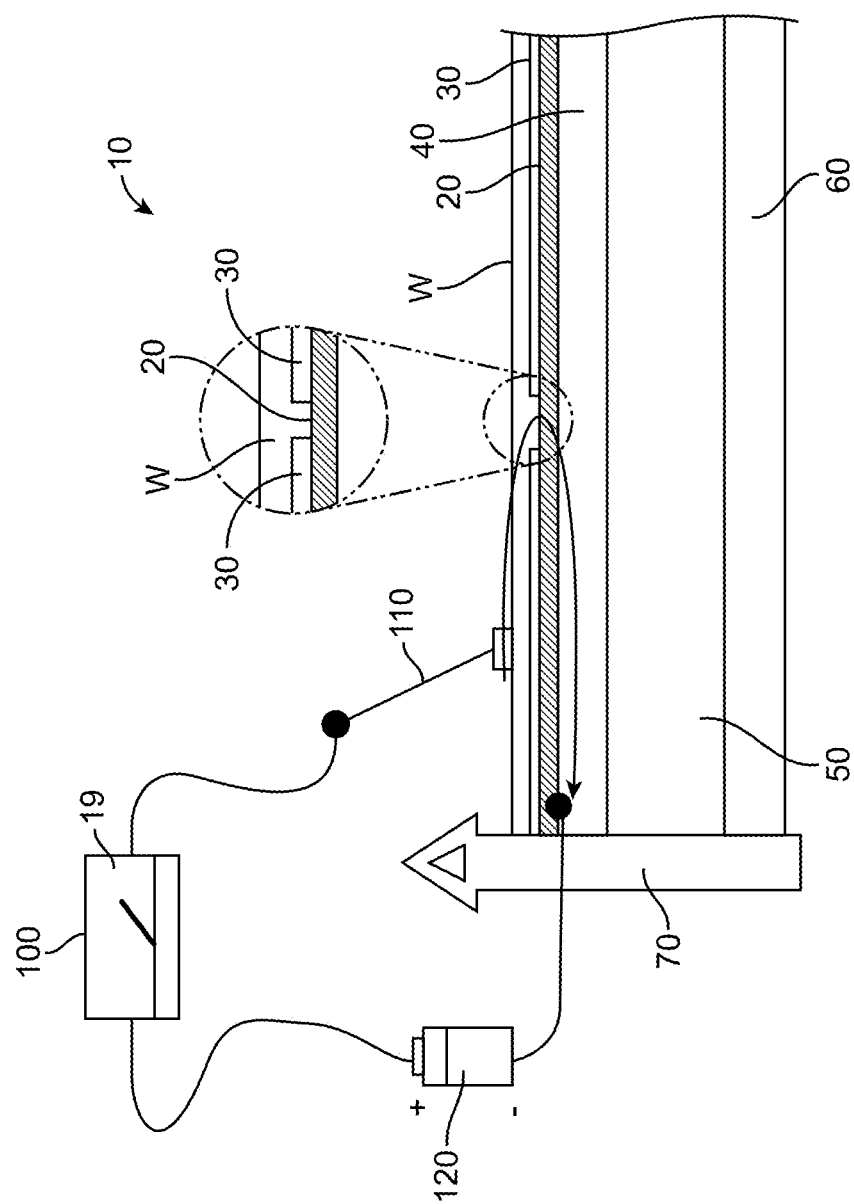
FIG. 1A is a sectional side elevation view of an assembled roofing system configured for electronic leak detection (ELD) in accordance with the present invention.

Referring first to FIG. 1, a sectional side elevation view of an assembled roofing system 10 is provided. Roofing system 10 is specifically configured for electronic leak detection (ELD). Electronic detection of water leaks into the roof is essentially the detection of breaks in the roofing membrane through which the water passes. As will be further explained in the embodiments described herein, a single conductive layer 20 is positioned below the roofing membrane 30. In prior art approaches, this conductive layer may simply be a layer that is painted onto the top of the insulation 50 or the top of the coverboards 40 (when coverboards are used) on the roof deck 60 prior to laying the roofing membrane 30 thereover. Alternatively, the conductive layer 20 may comprise a material such as chicken wire that is placed under the roofing membrane 20 on top of the insulation or coverboards 20. In contrast as well, in the Aquatrace and Smart Leak detection systems, two layers of conductive material (foil) are required for system operation.

The single conductive layer 20 is grounded to a structure like a metal roof vent 70 or even the peg of mount of a solar array that is connected to the roof deck below. Grounding to vent pipes, drain bowls, davits, etc. is all contemplated within the scope of the present system. An advantage of the present system is that it may be grounded at multiple locations to multiple objects on the roof. As such, the present system is well suited to mechanical fasteners. Such mechanical fasteners would not work with the Aquatrace and Smart Leak systems above as the mechanical fasteners would simply short out the circuit is they passed through both the upper and lower layers of conductive foil.

When a tear occurs through the roofing membrane 30, water W pooling on the top of the membrane will pass down through the hole in the roofing membrane and reach the conductive layer 20 below. A simple ELD system 100 is provided. ELD system 100 includes a probe 110 and battery 120. Probe 110 is used to apply a voltage potential to the water W on the surface of roofing membrane 30. The other end of the circuit is electrically connected to the conductive layer 20. For example, conductive layer 20 may be grounded to roof vent 70. If a hole is present in roofing material 20, then the electrical circuit will be completed and the indication of a detected leak will be given by system 100. On the other hand, if there are no holes in roofing membrane 30, then the voltage potential applied to water W will not reach conductive layer 20, and no leak will be detected. Importantly as well, the electronics in system 100 are only used when electronic leak detection is actually performed. This is fundamentally simpler than the Aquatrace and Smart Leak systems discussed above which require complex electronics that is in constant operation.

The main disadvantage of the existing prior art approaches such as the Detec System is the time taken to install the conductive layer 20 between cover boards 20 and roofing membrane 30. In accordance with the present system, however, the conductive layer is pre-attached (e.g.: pre-installed onto) one of either the insulation/coverboard or the roofing membrane. As such, the present single conductive layer 20 does not need to be installed into the overall finished roofing system as a separate step.

Figure 1B:
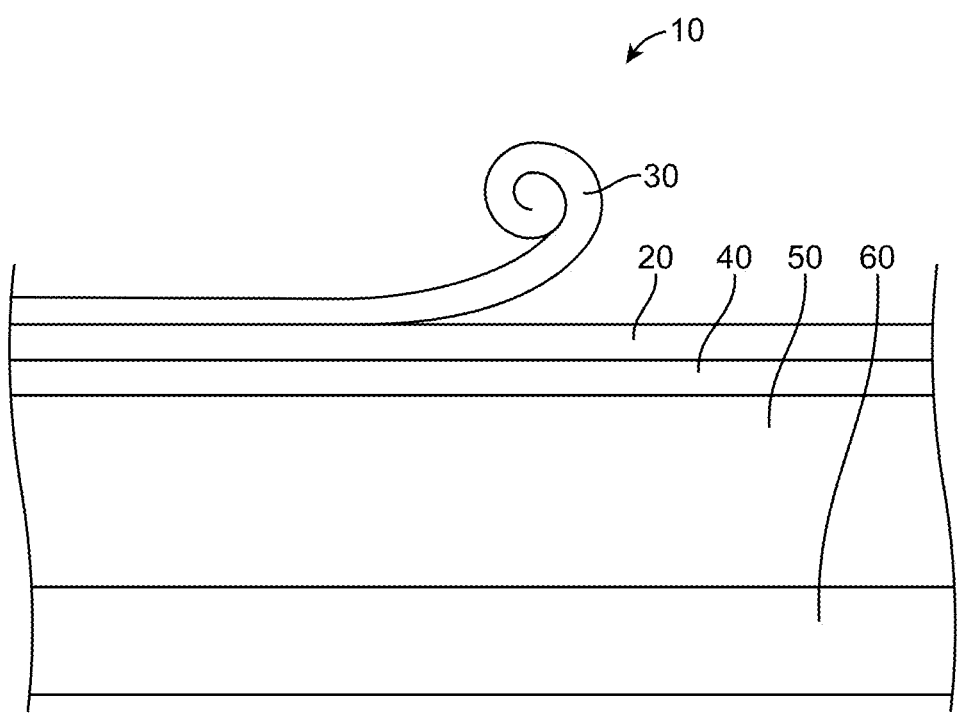
FIG. 1B is a sectional side elevation view of a roofing system having insulation with coverboards thereover, with a conductive layer pre-attached to the top surfaces of the coverboards, showing the installation of the roofing membrane rolled out thereover.
Figure 1C:
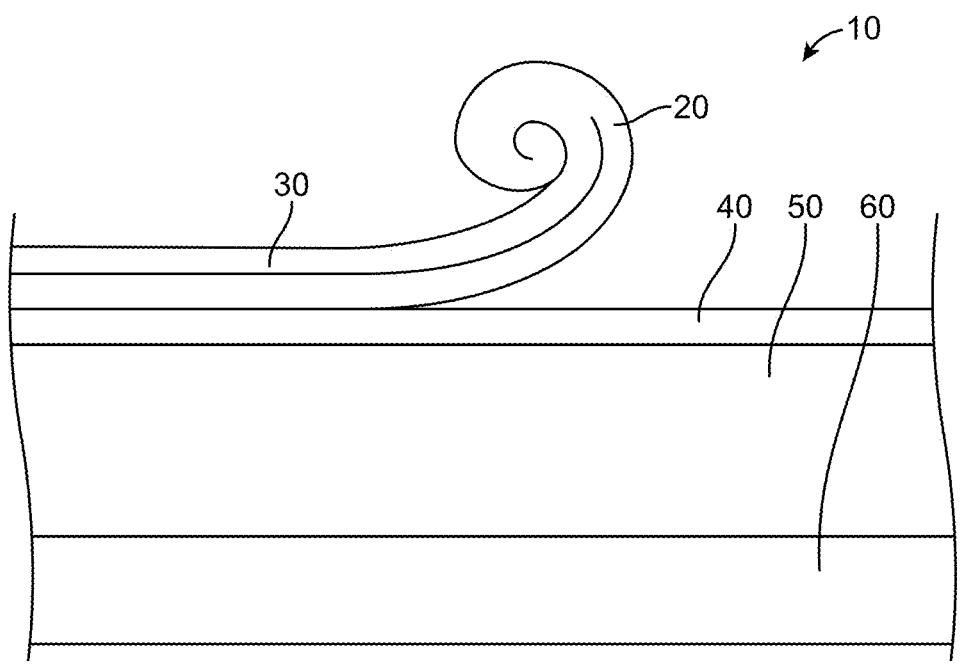
FIG. 1C is a sectional side elevation view of a roofing system with insulation and coverboards thereover, but instead having a conductive layer pre-attached to the bottom surface of the roofing membrane, also showing the installation of the roofing membrane rolled out thereover.

FIGS. 1B and 1C illustrate two different preferred ways to accomplish this. In the illustrated systems of FIGS. 1B and 1C, a layer of cover boards 40 are installed over the top of the insulation boards 50. As will be shown, the present invention operates in embodiments with and without such coverboards, as desired.

Referring first to FIG. 1B, insulation boards 50 are attached to roof deck 60. Such attachment may be made through mechanical fasteners, adhesives or any other suitable attachment system. A suitable adhesive would be Carlisle's CAV-GRIP III™ adhesive. Next, coverboards 40 are installed on top of insulation boards 50. Such attachment may also be made through mechanical fasteners, adhesives or any other suitable attachment system. Again, a suitable adhesive would be Carlisle's CAV-GRIP III™ adhesive. Insulation boards 50 may be made of polyiso or other suitable material. In addition, insulation boards 50 can have different compositions such as extruded polystyrene (XPS), expanded polystyrene (EPS), mineral wool, gypsum boards, plywood, foam, concrete, and other porous or insulating composite boards. In accordance with the present system, however, the conductive layer 20 is pre-attached onto the top surfaces of cover boards 40. In one preferred embodiment, the conductive layer 20 is made of a conductive foil layer that may be pre-laminated to the coverboard in the factory (i.e.: prior to its arrival at the jobsite). In other preferred embodiments, the conductive layer 20 may be made of a conductive non-woven or woven textile; a conductive cellulosic material, or any other suitable conductive material. The conductive layer 20 may be a pre-installed foil layer or a conductive layer made from physical or chemical vapor deposition of conductive materials such as aluminum, copper, or other conductive materials such as carbon black, metallic flakes, or microspheres embedded in a polymer or other composite films. The thickness of the conductive layer can optionally range from 0.1 mils to 20 mils.

As seen in FIG. 1B, after the coverboards 40 have been installed, all that it then required is to unroll the roofing membrane 30 thereover. Roofing membrane 30 may be attached onto the top of cover board 40's conductive layer 20 by adhesives laid out on top of the coverboards or by mechanical fasteners.

FIG. 1C is similar to FIG. 1B, however, the conductive layer 20 is instead pre-attached to the bottom surface of roofing membrane 30 (e.g.: pre-installed at a factory prior to shipping to a jobsite).

Figure 1D:
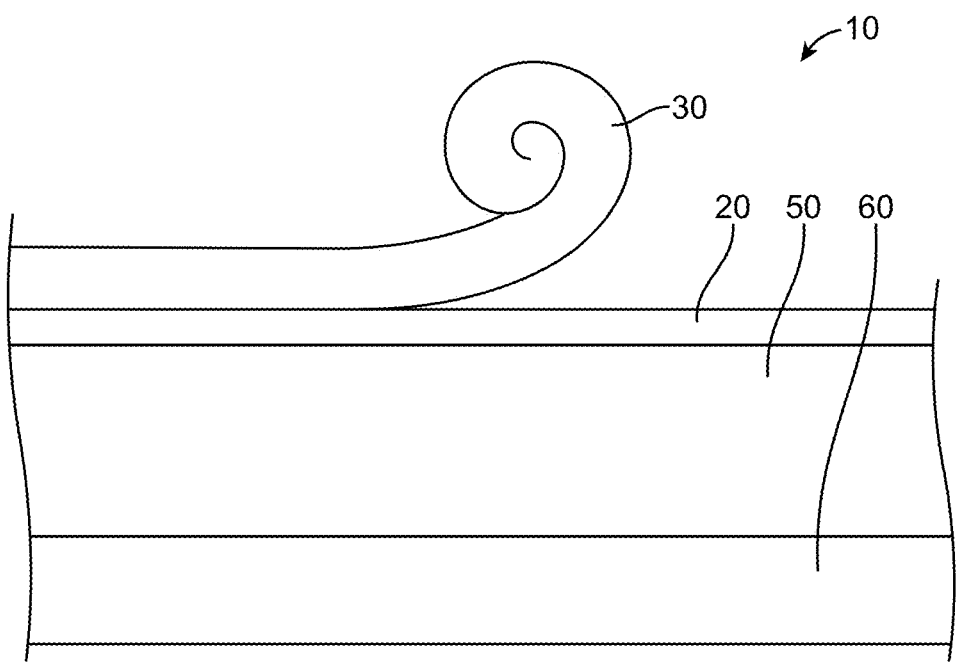
FIG. 1D is a sectional side elevation view of a roofing system similar to FIG. 1B, but without having coverboards, instead having the conductive layer pre-attached to the top of the insulation boards themselves.

FIG. 1D is similar to FIG. 1B, however, in FIG. 1D, no coverboards are used. As such, the conductive layer 20 is installed directly on top of the insulation boards 50 instead.

Figure 1E:
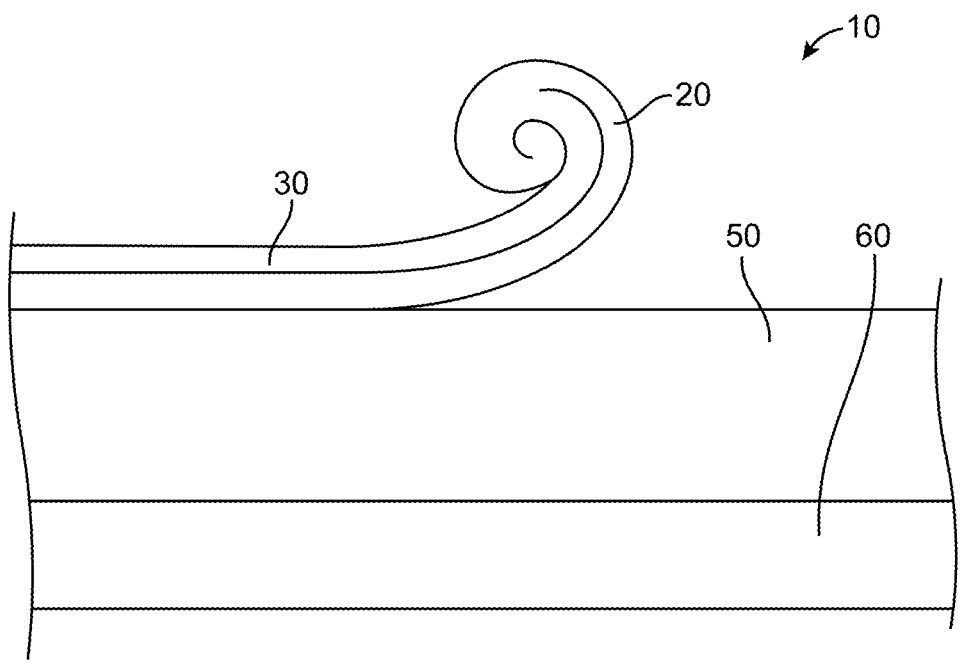
FIG. 1E is a sectional side elevation view of a roofing system similar to FIG. 1B, but without having coverboards, but instead having the conductive layer pre-attached to the bottom of the roofing membrane.

FIG. 1E is similar to FIG. 1C, however, in FIG. 1E, no coverboards are used. As such, the conductive layer 20 is installed directly on top of the insulation boards 50 instead.

Figure 2A:
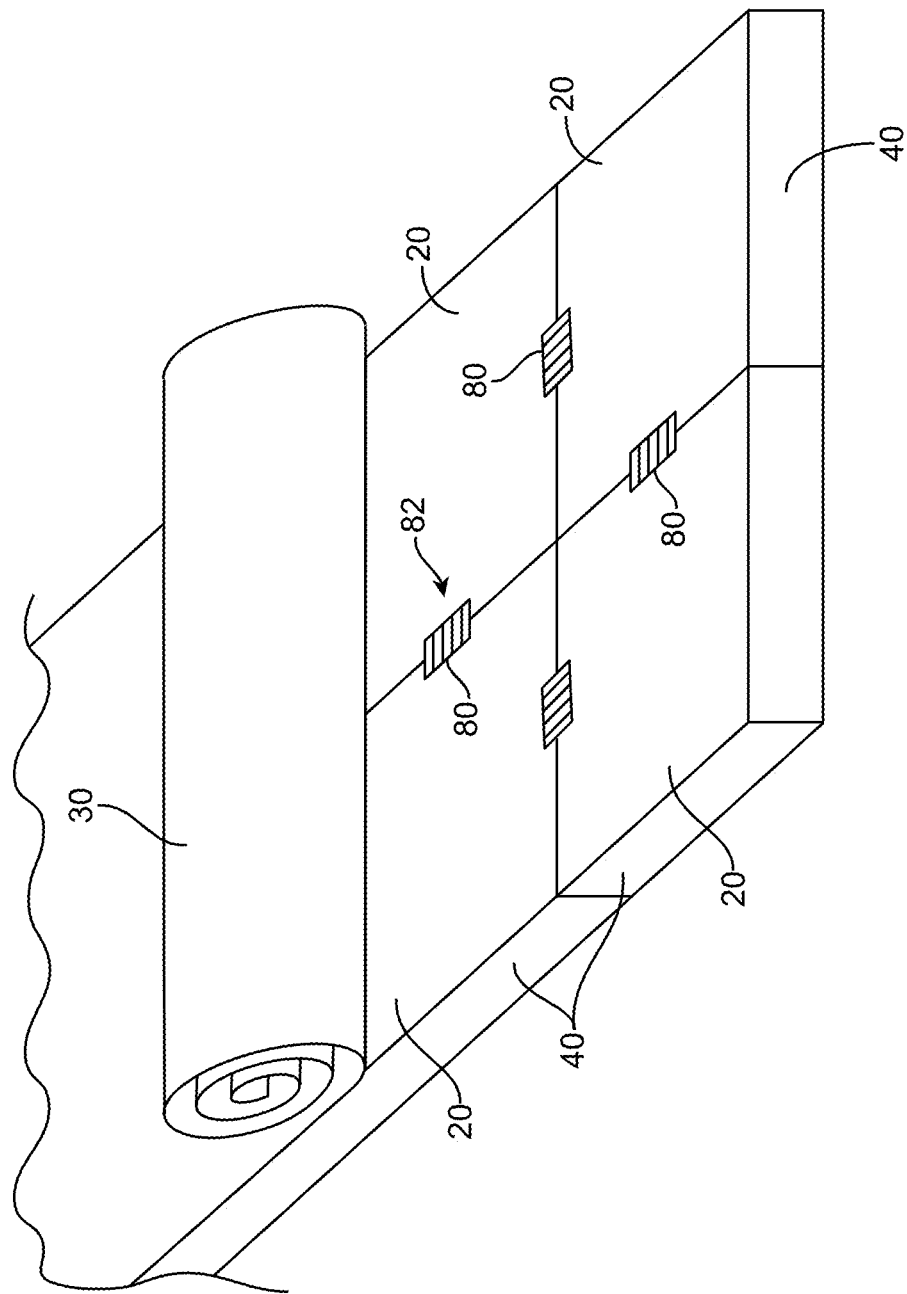
FIG. 2A is a perspective view of a plurality of adjacent coverboards with conductive layers pre-attached to their top surfaces showing the conductive layers being electrically connected together with conductive connector plates.
Figure 2B:
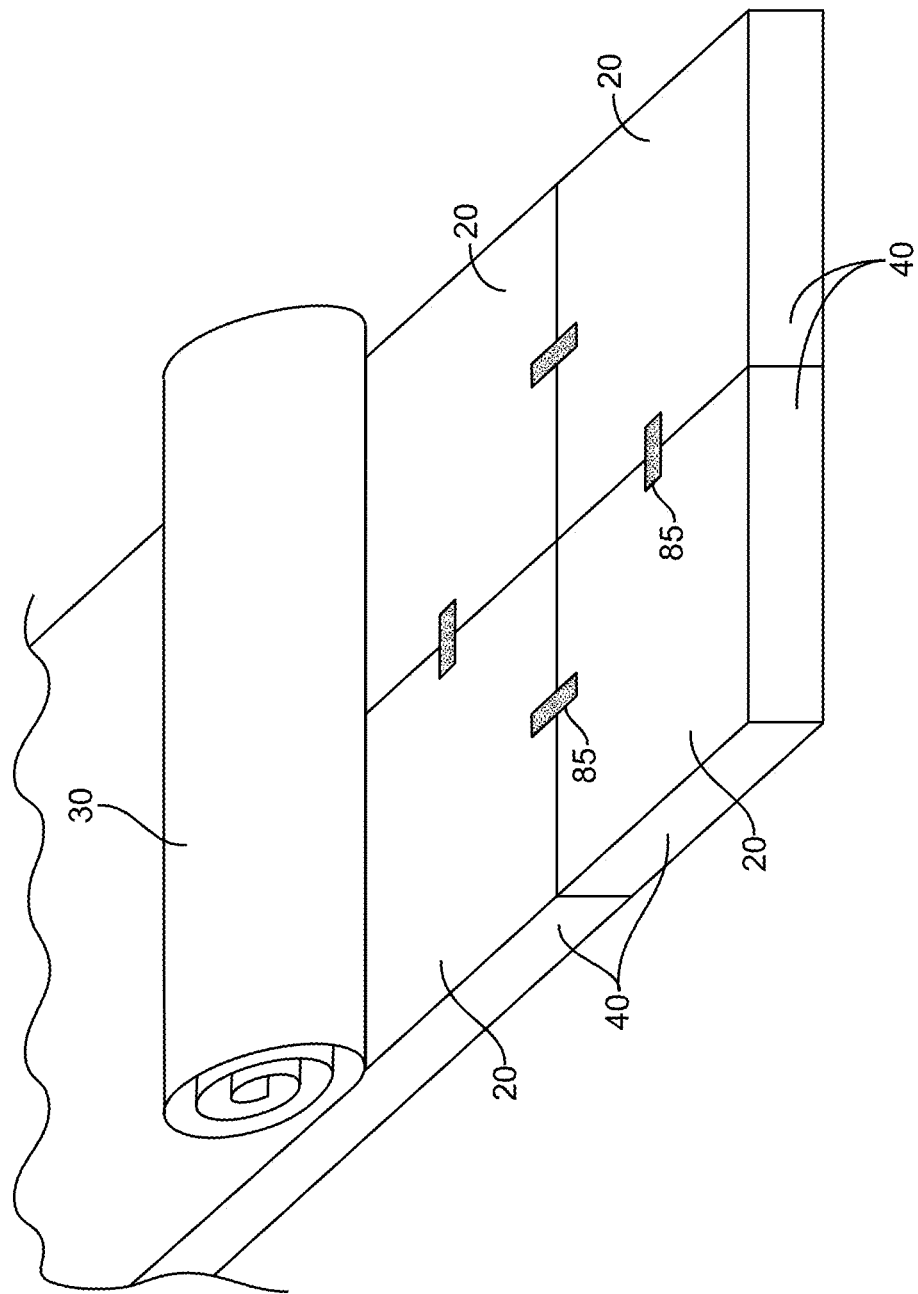
FIG. 2B is a perspective view of a plurality of adjacent coverboards with conductive layers pre-attached to their top surfaces showing the conductive layers being electrically connected together with strips of conductive tape.
Figure 3A:
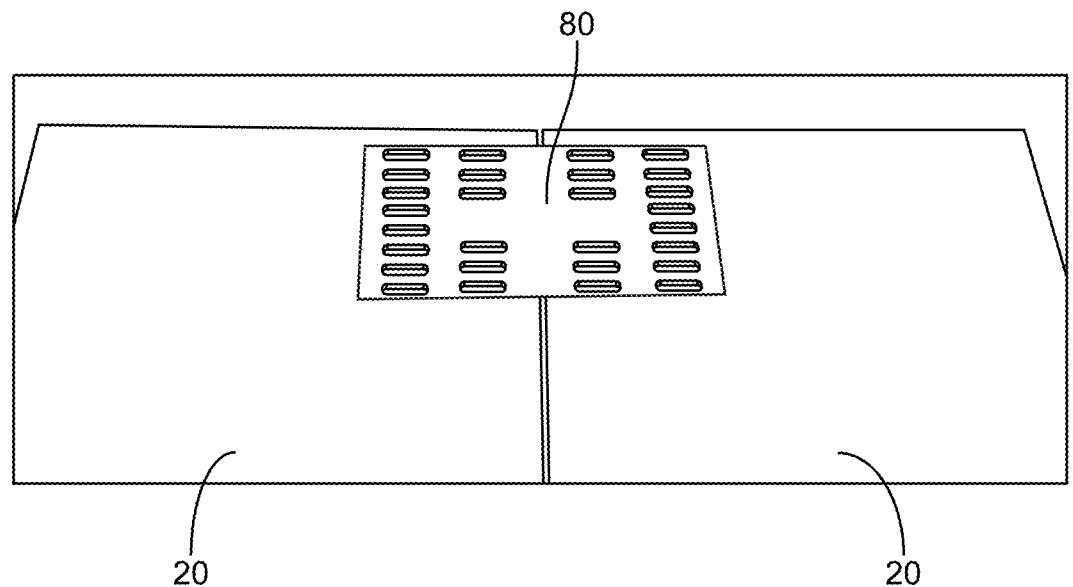
FIG. 3A is a close-up view of one of the conductive connector plates of FIG. 2A.
Figure 3B:
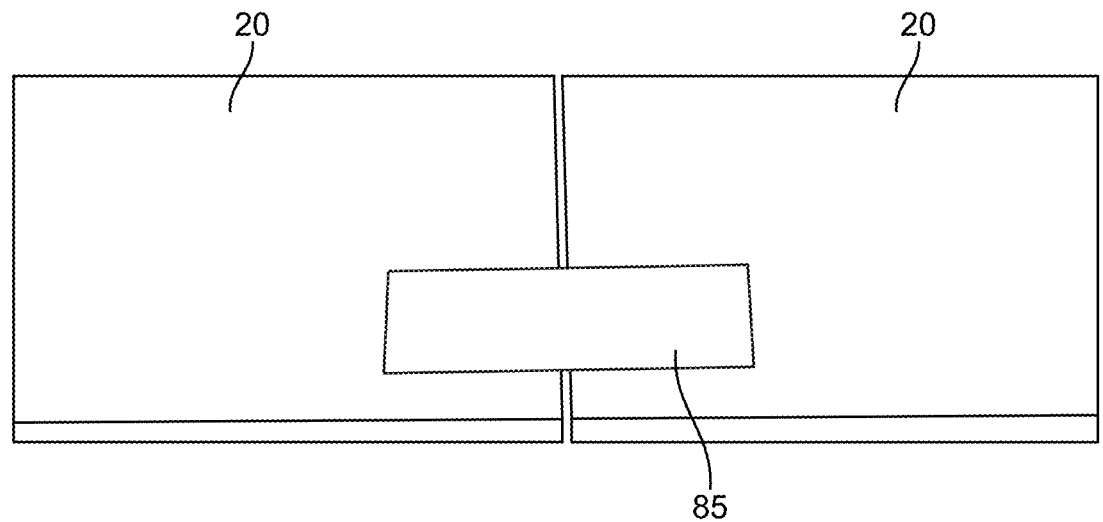
FIG. 3B is a close-up view of one of the conductive tape strips of FIG. 2B.

FIG. 2A and FIG. 2B illustrate two different preferred systems for electrically connecting the conductive layers 20 of two or more adjacent (e.g.: side-by-side) coverboards 40 (prior to the roll of roofing membrane 30 be unrolled and positioned thereover. Specifically, as first seen in FIGS. 2A and 3A, a conductive plate 80 may be placed across the side edges of the adjacent cover boards 40. Conductive plate 80 will conduct electricity from the conductive layer 20 on one coverboard 40 to the conductive layer 20 on an adjacent coverboard 40. In preferred embodiments, conductive plate 80 may optionally have a series of teeth 82 thereon which are simply pushed down into conductive layers 20 on both of the adjacent coverboards, thereby securely grounding one conductive layer to another.

FIG. 2B simply shows the use of a conductive tape 85 instead of a grounding plate 80 to make this connection instead. Installation of either of connecting plate 80 or conductive tape 85 is simple and easy and can be done with workers as they progress across the roof (prior to unrolling and fastening roofing membrane 30 down onto the roof (thereby sealing the connecting plates 80 of FIG. 2A or the conductive tape strips 85 of FIG. 2B thereunder). Alternative conductive connectors can include a shiplap joint with conductive tape or adhesive factory applied to the insulation board, finger joints with electrically conductive tapes across the joints, insulation plates and fasteners, and/or pressure sensitive adhesives utilizing a conductive film and conductive pressure sensitive adhesive. Another optional way of connecting adjacent boards is by using an inductive coupling similar to wireless charging used for cell phones.

A particular advantage of the present system is that such connections need only be made for the single conductive layer in the system. In contrast, in the Aquatrace and Smart Leak systems, electronic connections need to be made laterally across the roof at both the tops and bottoms of the insulation boards. This doubles the workload, as it can be difficult to make electrical connections simultaneously across the top and bottom sides of the insulation boards.

Figure 4A:
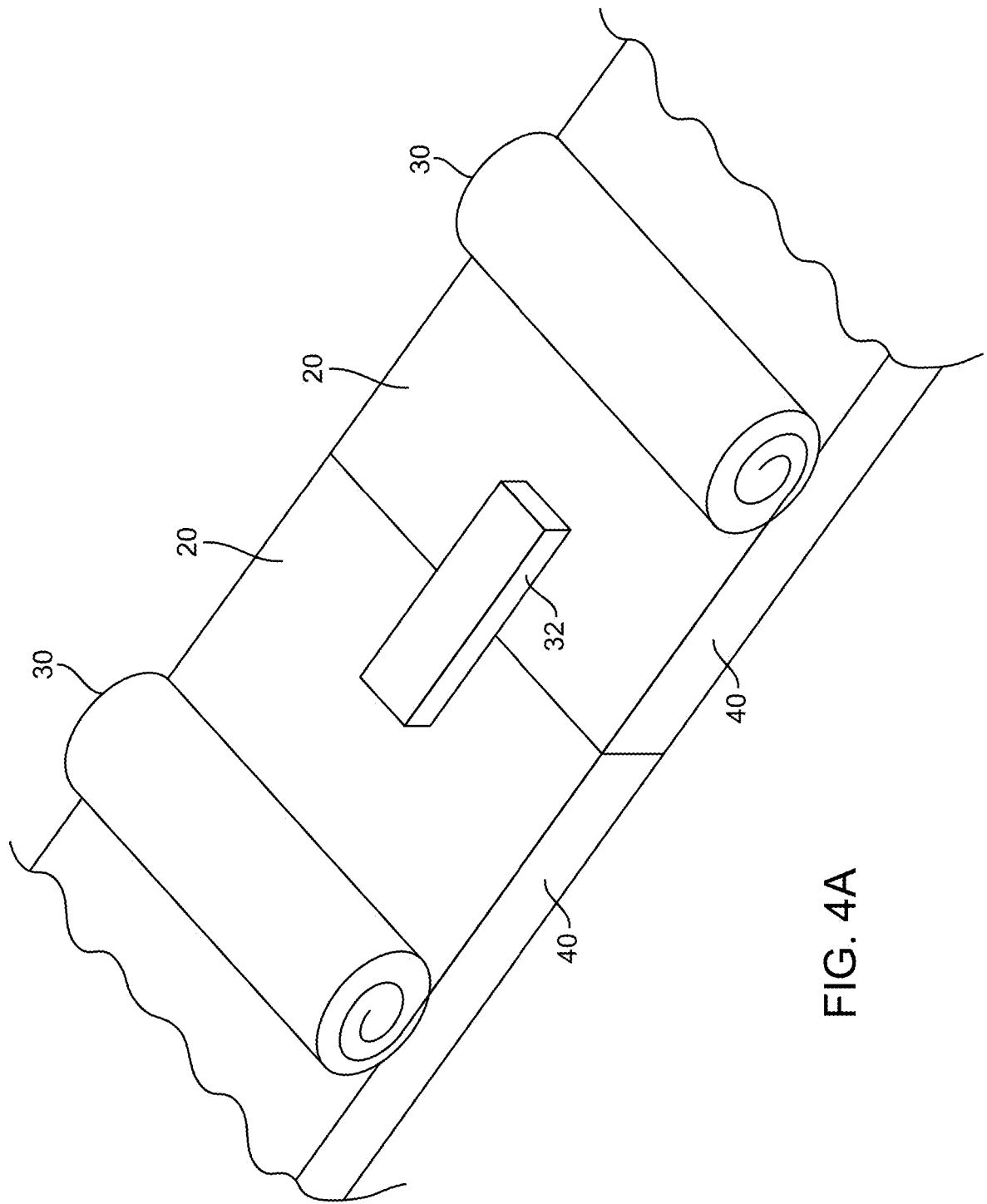
FIG. 4A is a perspective view of a plurality of adjacent coverboards showing the position of a strip of roofing membrane having a conductive layer thereon spanning across the side edges of two adjacent coverboards prior to placing two adjacent roofing membranes having conductive bottom surfaces thereover.
Figure 4B:
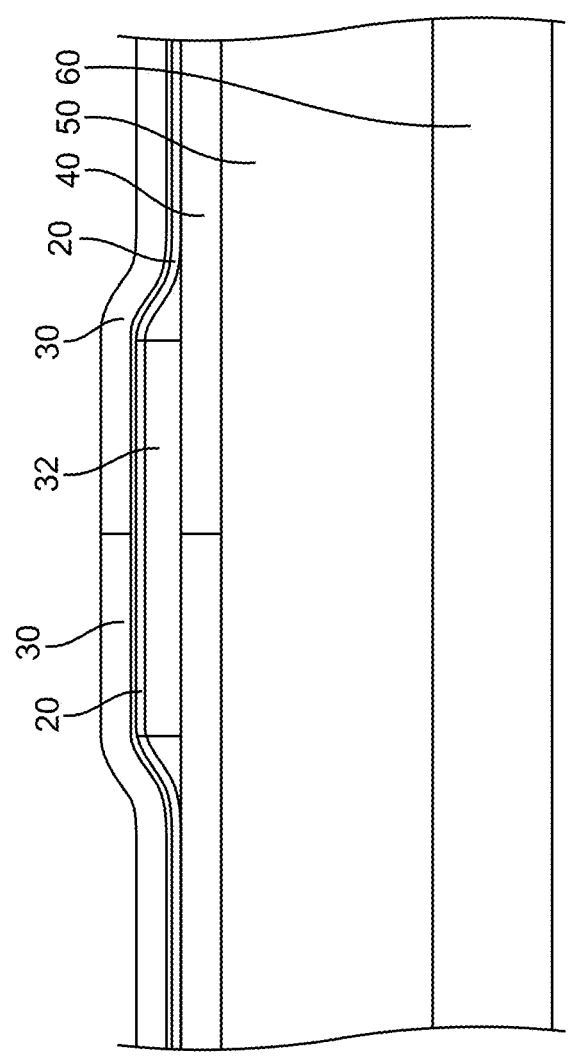
FIG. 4B is a sectional side elevation view corresponding to FIG. 4A after the two adjacent roofing membranes have been placed into their final position.

FIGS. 4A and 4B illustrate a preferred system for grounding two sheets of roofing material 30 together in the case where the layer of conductive material 20 is instead pre-applied to the bottom of the roofing membranes 30. In this illustration, two different rolls of roofing membrane 30 are rolled out onto the top of the coverboards 40 (or insulation boards 50 in the absence of coverboards 40). FIGS. 4A and 4B illustrate how the conductive layer 20 on the bottom of one roofing membrane is electrically connected to the conductive layer 20 on the next roll of roofing membrane 50. As can be seen, a small strip 32 of the same roofing membrane 30 is simply cut and placed upside down across the side edges of the two coverboards 40. Since roofing membrane strip 32 already has conducting layer 20 thereon, it is simply positioned upside down. As such, the conductive surface 10 of strip 32 will electrically connect the conductive layers 20 on the separate roofing membrane sections 50 together. This provides a fast and easy way to make electrical connections from one insulation board (or coverboard) to the next as the roofing is installed.

One advantage of the present foil faced insulation board/coverboard (or roofing membrane) is that it dramatically reduces the installation time as compared to the currently available Detec-style conductive substrates. This is because current substrates are layers that must be separately installed on the roof. In one embodiment the installation time was reduced by 90% or higher. The present one-step approach thereby improves productivity and saves money. In one embodiment the installed cost was reduced by 25-75%. In addition, the present system can be used at any temperature (between −20° F. and 120° F.) and thereby expands the installation window to all year long. In contrast, products like Detec's TruGround™ system is water based and therefore must be installed in above freezing temperatures (typically 32° F. and above). As can be appreciated, the present factory pre-installed foil facer system also advantageously allows roof membranes to be adhered with minimal issues.

Foil faced substrates are currently available in the market. However, they are used as radiant barriers on wall systems and not in roofing systems. The current product offerings used in wall systems are significantly more expensive (50% or more expensive) compared to insulation boards used in roofing systems. The present invention of foil faced insulation/cover boards or foil faced roofing membranes will be significantly less expensive (50% or more) compared to the current ELD system offerings by Detec and other ELD manufacturers.

In further optional embodiments, the present ELD system 100 measures ohmic resistance to the applied voltage potential to determine one of: (i) a location of a roof leak, or (ii) a size of a roof leak.

What is claimed is:

1. A roofing system configured for electronic leak detection, comprising:
   (a) a roof deck;
   (b) an insulation board or a coverboard positioned above the roof deck;
   (c) a continuous conductive foil layer positioned above the insulation board or the coverboard; and
   (d) a roofing membrane positioned above the continuous conductive foil layer, wherein the continuous conductive foil layer is in direct contact with an underside surface of the roofing membrane, and wherein the continuous conductive foil layer is either pre-attached onto:
      (i) a top side of the insulation board or a top side of the coverboard, or
      (ii) a bottom side of the roofing membrane, and
   wherein the roofing system comprises only one continuous conductive foil; and
   (e) a removable electronic leak detection system, comprising:
      (i) a probe configured for applying a voltage to water sitting on a top surface of the roofing membrane, the probe configured to detect a leak at any point on the roofing membrane, and
      (ii) a grounding connector configured to be connected to a structure that is grounded to the roof deck, wherein the structure that is grounded to the roof deck is positioned above the roofing membrane and is in electrical communication with the continuous conductive foil layer.

2. The roofing system of claim 1, wherein the continuous conductive foil layer is either:
   (i) pre-attached to the top side of the insulation board or coverboard prior to the insulation board or coverboard being shipped to a jobsite, or
   (ii) pre-attached to the bottom side of the roofing membrane prior to the roofing membrane being shipped to a jobsite.

3. The roofing system of claim 1, further comprising:
   a plurality of conductive connectors, wherein each of the plurality of conductive connectors electrically connects:
   (i) the continuous conductive foil layer on the insulation board or on the coverboard to a continuous conductive foil layer on an adjacent insulation board or coverboard, or
   (ii) the continuous conductive foil layer on the roofing membrane to a continuous conductive foil layer on an adjacent roofing membrane.

4. The roofing system of claim 3, wherein each conductive connector is either:
   (i) a conductive connector plate configured to be attached to side edges of a pair of adjacent insulation boards, cover boards or roofing membranes; or
   (ii) a strip of conductive tape configured to be attached to side edges of a pair of adjacent insulation boards, cover boards or roofing membranes.

5. The roofing system of claim 4, wherein each conductive connector is a strip of the roofing membrane having the conductive layer on the bottom side, and wherein the strip is placed upside down spanning between side edges of two adjacent roofing membranes.

6. The roofing system of claim 1, wherein the insulation board or coverboard comprises any one of:
   an insulation board alone;
   a coverboard alone, or
   a coverboard on top of an insulation board.

7. The roofing system of claim 1, wherein the continuous conductive foil layer is laminated to:
   the top side of the insulation board or coverboard, or
   the bottom side of the roofing membrane.

8. The roofing system of claim 7, wherein the continuous conductive foil layer is laminated in a factory.

9. The roofing system of claim 1, wherein the membrane is one of:
   TPO;
   EPDM; or
   PVC.

10. A method of assembling a roofing system configured for electronic leak detection, comprising:
    (a) placing an insulation board or a coverboard onto a roof deck; and then
    (b) placing a roofing membrane onto the insulation board or coverboard, wherein either:
       (i) the insulation board or coverboard has a continuous conductive foil layer pre-attached thereto, or
       (ii) the roofing membrane has a continuous conductive foil layer pre-attached thereto, and wherein the continuous conductive foil layer is in direct contact with an underside surface of the roofing membrane, such that the continuous conductive foil layer is installed together with installation of the insulation board or coverboard or together with the installation of the roofing membrane, and wherein the continuous conductive foil layer is the only layer of conductive material in the roofing system; and then
    (c) attaching a removable electronic leak detection system, by:
       (i) placing a probe into water sitting on a top surface of the roofing membrane, wherein the probe is configured for applying a voltage to the water sitting on a top surface of the roofing membrane, wherein the probe is configured to detect a leak at any point on the roofing membrane, and
       (ii) connecting a grounding connector to a structure that is grounded to the roof deck, wherein the structure that is grounded to the roof deck is positioned above the roofing membrane and is in electrical communication with the continuous conductive foil layer.

11. The method of claim 10, further comprising:
    electrically connecting the continuous conductive foil layer on one insulation board or coverboard to a continuous conductive foil layer on an adjacent insulation board or coverboard; or
    electrically connecting the continuous conductive foil layer on one roofing membrane to a continuous conductive foil layer on an adjacent roofing membrane.

12. The method of claim 10, wherein the step of electrically connecting is performed by installing a conductive connector plate or a conductive tape.

13. The method of claim 10, further comprising:

placing a strip of the roofing membrane upside down spanning between the side edges of two adjacent roofing membranes.

* * * * *